L. White,

Wick-Raiser.

No. 4,304. Reissued Mar. 14. 1871.

Rufus S. Merrill, assignee of Lewis White by atty R. Pollok

WITNESSES.

D. P. Cook

J. Wattingham

N. PETERS, PHOTO-LITHOGRAPHER, WASHINGTON, D. C.

United States Patent Office.

LEWIS WHITE, OF WATERBURY, CONNECTICUT, ASSIGNOR, THROUGH MESNE ASSIGNMENTS, TO RUFUS S. MERRILL, OF BOSTON, MASSACHUSETTS; SAID RUFUS S. MERRILL ASSIGNOR OF TWO-THIRDS OF HIS RIGHT TO WILLIAM B. MERRILL AND JOSHUA MERRILL, OF SAME PLACE.

Letters Patent No. 25,475, dated September 13, 1859; reissue No. 4,304, dated March 14, 1871.

IMPROVEMENT IN LAMPS.

The Schedule referred to in these Letters Patent and making part of the same.

*To whom it may concern:*

Be it known that I, LEWIS WHITE, formerly of Hartford, Connecticut, now of Waterbury, in the county of New Haven and State of Connecticut, have invented certain new and useful Improvements in Lamps, of which the following is a specification.

My invention relates to devices for raising and lowering or adjusting the wicks of lamp-burners; and It consists in the arrangement in a lamp-burner of shafts or spindles, carrying two or more wick-raising ratchet or toothed wheels, and provided with pinions, geared together in such manner that, by rotating one shaft, the other will be caused to rotate also, the ratchet-wheels upon both shafts being thus put in motion simultaneously to act in unison upon the wick.

My invention further consists in the combination, with the wick-tube, of parallel shafts, arranged on opposite sides of the same, carrying two or more ratchet or toothed wick raising wheels, and geared together to move in unison to raise or lower the wick.

My invention further consists in the combination of the wick-tube and the wick-raising ratchet or toothed wheels with means, substantially such as herein described, whereby the said wheels may be withdrawn from contact with the wick or wicks contained in said tube, the object of this portion of my invention being to remove the teeth from the wick while the latter is being inserted in the wick-tube, and thus to facilitate the operation.

To enable those skilled in the art to understand and use my invention, I will now proceed to describe the manner in which the same is or may be carried into effect, by reference to the accompanying drawing, in which—

Figure 1:
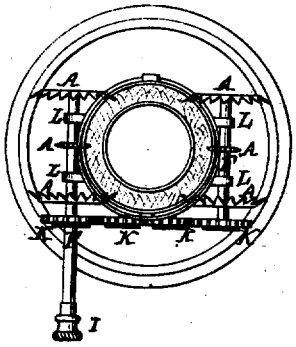
Figure 1 is a plan view of a lamp-burner embodying my invention.

The burner I have represented in illustration of the manner in which my invention can be used is a "round-wick" or Argand-burner, which should be provided with the usual appliances for securing it to the lamp, for holding the chimney, &c. The construction and operation of such a burner is well known, and I will therefore confine myself to a description of the arrangement of the wick-raising devices.

In order to raise all parts of the wick or wicks evenly, and thus produce a proper flame, I employ a number of ratchet or toothed wheels, A, of ordinary or suitable construction, which are intended to engage with or impinge upon the wick or wicks at suitable points.

To hold them in proper position I mount them upon spindles or shafts, F F, each shaft carrying two or more—in this instance three—of the wick-raising wheels A.

The shafts are mounted and revolve in bearings, L, placed on the wick-tube or other portion of the burner, and in such position that the wheels will impinge upon the wick through the usual slots formed for that purpose in the wick-tube. In a round-wick burner, such as shown, this result is best attained by arranging the shafts parallel with each other and on opposite sides of the wick-tube, as represented in the drawing, the parallelism of the shafts also facilitating the gearing them together.

In order that the shafts may revolve in unison and simultaneously, I provide each with a pinion, K, the two being geared so that, by revolving one shaft the other will also be rotated, the rotation of the two taking place in opposite directions, so that the toothed wheels on opposite sides of the tube may act in concert to raise or lower the wick. As the shaft-pinions K, in this instance, are not of sufficient size to gear directly together, they are connected by two intermediate gears, K, mounted and revolving on pins attached to the wick-tube.

One of the shafts F extends beyond the burner, and is provided with the usual milled head I, to enable the shafts and wheels to be actuated by hand whenever desired.

Figure 2:
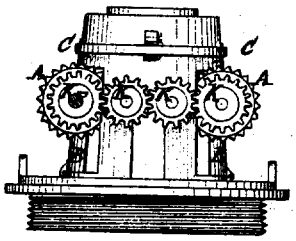
Figure 2 is a side elevation of the same.
Figure 3:
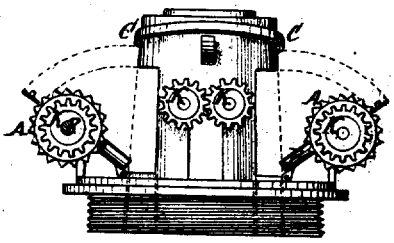
Figure 3 is a similar view, with the wick-raising devices removed from the wick-tube.

For the purpose of allowing the wheels A to be withdrawn from the wick-tube a sufficient distance to prevent them from interfering with the insertion of a wick into the tube, I mount the shafts F in pieces B, which are capable of being moved toward and away from the wick. These pieces, as shown in the drawing, can form movable sections or portions of the outer wick-tube, and are hinged at their lower ends to the burner, as seen more plainly in figs. 2, and 3, so that they may be swung back to withdraw the wheels A from the wick. The flaps B, when in the position shown in fig. 2, may be held in place by a ring, C, which fits the outer wick-tube, and is pressed down to encircle or clasp the upper ends of the flaps.

In conclusion, I would state that I do not claim, broadly, adjusting lamp-wicks by means of ratchet-wheels geared together to move in unison, as this feature is described and shown in Letters Patent granted to Albert H North on the 5th day of April, 1859. My invention, in this direction, is intended to simplify the mechanism, to render it cheaper and more readily applicable to lamp-burners.

Having described my invention and the manner in which the same is or may be carried into effect,

What I claim, and desire to secure by Letters Patent, is—

1. The arrangement, in a lamp-burner, of shafts or spindles carrying two or more wick-raising toothed wheels which impinge upon the wick, and provided with pinions, geared together substantially in the manner shown and described, so that by rotating one shaft the other will also be put in motion, thereby causing all the wheels upon the shafts to act in unison upon the wick.

2. The combination of the wick-tube with the parallel shafts, arranged on opposite sides of the tube, carrying two or more toothed wick-raising wheels, and geared together, substantially in the manner shown and described, so that the rotation of the one shaft will cause the rotation of the other in the opposite direction, for the purposes set forth.

3. The combination, with the wick-tube and wick-raising devices, of means, substantially such as herein shown and described, whereby the said wick-raising devices may be removed, when required, from contact with the wick contained in said tube.

In testimony whereof I have hereunto signed my name in presence of two subscribing witnesses.

LEWIS WHITE.

Witnesses:

CHARLES B. MERRILL,
RUSSELL W. AYERS.